(12) United States Patent
Johnson

(10) Patent No.: US 11,378,042 B1
(45) Date of Patent: Jul. 5, 2022

(54) INTERNAL COMBUSTION ENGINE IGNITION DEVICE

(71) Applicant: Dan H. Johnson, Talco, TX (US)

(72) Inventor: Dan H. Johnson, Talco, TX (US)

( * ) Notice: Subject to any disclaimer, the term of this patent is extended or adjusted under 35 U.S.C. 154(b) by 0 days.

(21) Appl. No.: 17/547,650

(22) Filed: Dec. 10, 2021

(51) Int. Cl.
| F02M 27/00 | (2006.01) |
| F02P 13/00 | (2006.01) |
| F02P 3/02  | (2006.01) |

(52) U.S. Cl.
CPC .............. *F02M 27/00* (2013.01); *F02P 3/02* (2013.01); *F02P 13/00* (2013.01)

(58) Field of Classification Search
CPC .............. F02M 27/00; F02P 3/02; F02P 13/00
See application file for complete search history.

(56) References Cited

U.S. PATENT DOCUMENTS

| 4,539,503 | A | * | 9/1985 | Esper .................. H01T 13/20 |
| | | | | 313/11.5 |
| 5,983,871 | A | * | 11/1999 | Gordon ................ F02P 23/04 |
| | | | | 123/143 B |
| 7,806,094 | B2 | | 10/2010 | Gruber |
| 8,181,617 | B2 | | 5/2012 | Kuhnert et al. |
| 8,365,689 | B2 | | 2/2013 | Gruber et al. |
| 8,746,197 | B2 | | 6/2014 | McAlister |
| 9,893,497 | B2 | | 2/2018 | Chiera et al. |
| 10,903,626 | B2 | | 1/2021 | Lee et al. |
| 10,907,605 | B2 | | 2/2021 | Mayer et al. |
| 10,975,759 | B2 | | 4/2021 | Anderson et al. |
| 2013/0104827 | A1 | | 5/2013 | Woener et al. |

(Continued)

FOREIGN PATENT DOCUMENTS

| EP | 2458177 | 5/2012 |
| WO | WO-2007133069 A1 * | 11/2007 | ............. H01L 35/30 |

OTHER PUBLICATIONS

Wikipedia, Chirped Pulse Amplification, https://en.wikipedia.org/wiki/Chirped_pulse_amplification, accessed Oct. 26, 2021, pp. 1-6 (Year: 2021).*

(Continued)

*Primary Examiner* — Jacob M Amick
*Assistant Examiner* — Charles J Brauch
(74) *Attorney, Agent, or Firm* — Grady K. Bergen; Griggs Bergen LLP

(57) ABSTRACT

An internal combustion engine ignition device is provided for increasing the thermal efficiency of an internal combustion engine by increasing the spark length within the combustion chamber, wherein the spark can extend the width of the combustion chamber. The ignition device includes an ignition device housing to which a laser source is coupled. The laser source generates a laser beam capable of ionizing a fuel and/or an oxygen-containing gas used for combustion of the fuel in a combustion chamber. An electrical spark generator having a cathode electrode is coupled to the ignition device housing. The spark generator is configured for generating an electrical spark that emanates from the cathode within the combustion chamber and extends through the ionized fuel and/or ionized oxygen-containing gas, which may extend through the expanse of the combustion chamber, to a ground electrode within the combustion chamber to provide a more efficient and rapid fuel combustion within the combustion chamber.

20 Claims, 7 Drawing Sheets

(56) References Cited

U.S. PATENT DOCUMENTS

2017/0044970 A1    2/2017  Chiera et al.

OTHER PUBLICATIONS

Scitechdaily, Laser Beams Used to Create Filament Paths Could Potentially Direct Lightning, Mar. 31, 2012, pp. 1-3.
Mancuso et al., Observation of Ionization enhancements in two-color circularly polarized laser fields, Aug. 2, 2017, Phys. Rev. A 96, 023402.
Wikipedia, Ionization, https://en.wikipedia.org/wiki/Ionization, accessed Oct. 26, 2021, pp. 1-14.
Edmund Optics, Fundametals of Lasers, https://www.edmundoptics.com/knowledge-center/application-notes/lasers/fundamentals-of-lasers/, Accessed Oct. 26, 2021, pp. 1-5.
Wikipedia, Chirped pulse amplification, https://en.wikipedia.org/wiki/Chirped_pulse_amplification, accessed Oct. 26, 2021, pp. 1-6.
Untitled Article, Introduction—Atmospheric molecular cluster-ions . . . , admitted prior art, pp. 1-22.
Wikipedia, Spark plug, https://en.wikipedia.org/wiki/Spark_plug, accessed Apr. 19, 2022, pp. 1-13.

* cited by examiner

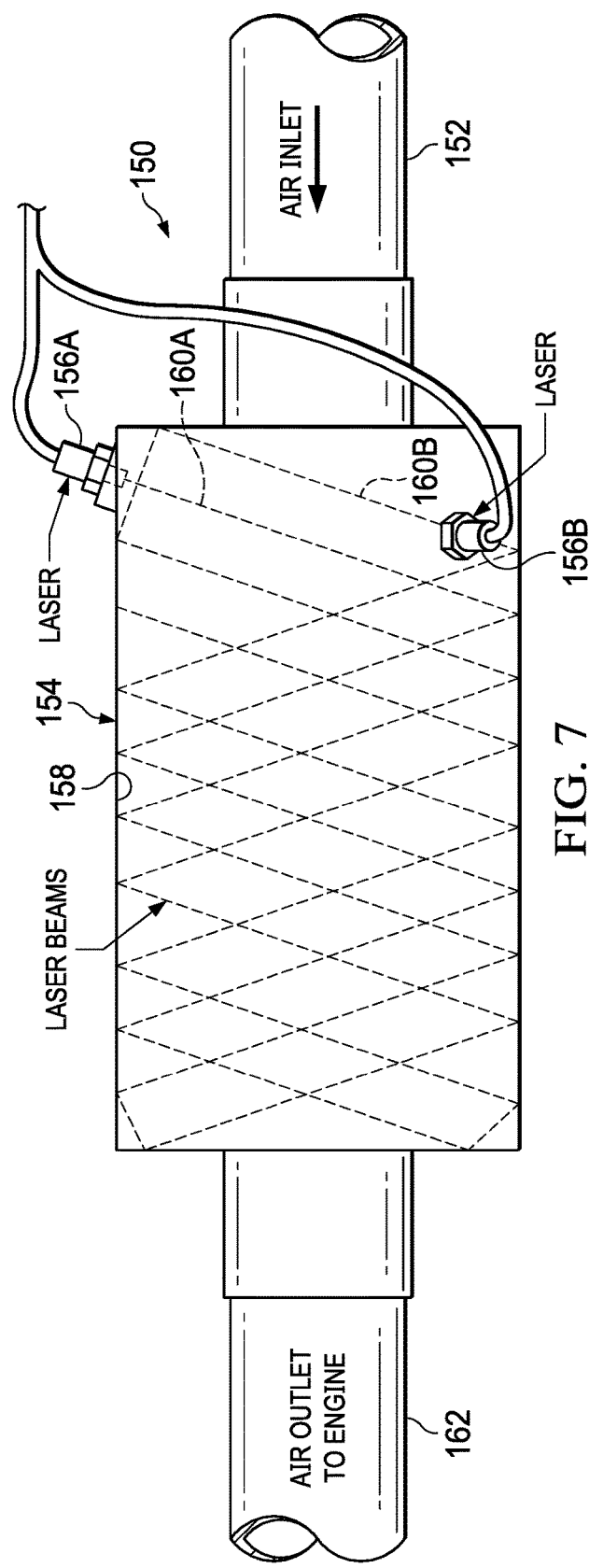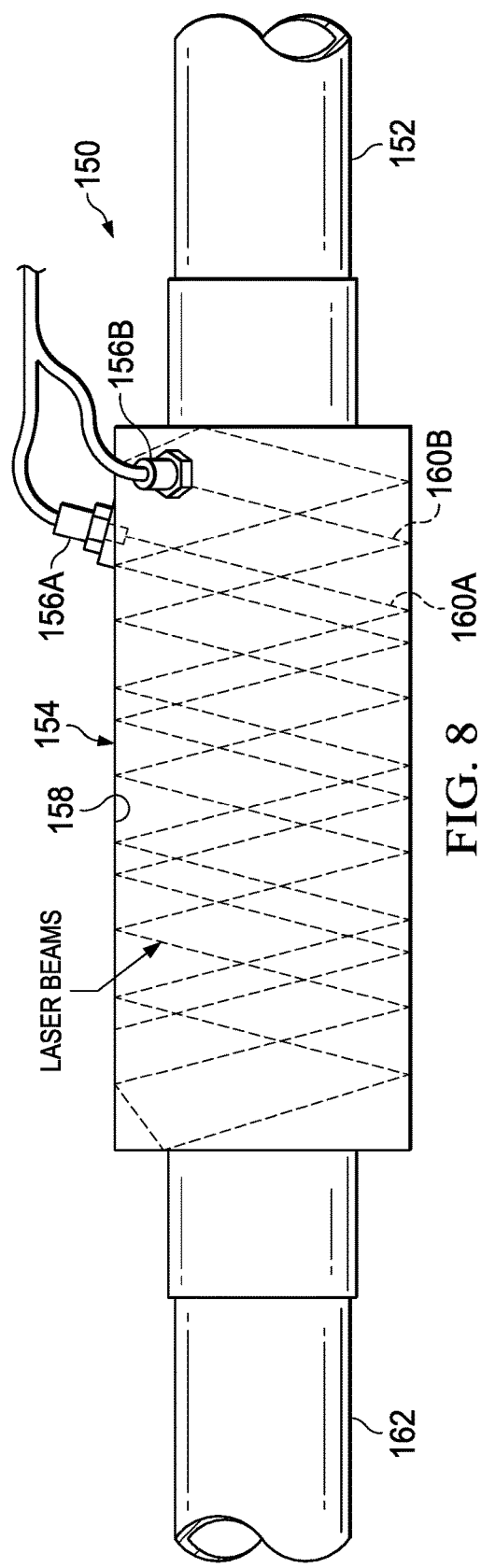

INTERNAL COMBUSTION ENGINE IGNITION DEVICE

TECHNICAL FIELD

The invention relates to internal combustion engines and more particularly to ignition systems for such combustion engines.

BACKGROUND

The internal combustion engine has seen many improvements over the previous decades in regard to its volumetric efficiency. These include larger ports, larger carburetors, more carburetors, three angle valve seats, superchargers, overhead valves, turbochargers, intercoolers and many more. The thermal efficiency has seen very little improvement during the same time span, however, largely because of the limits of the conventional spark plugs. In contrast to this, the ignition devices of the present invention can provide the biggest gain in thermal efficiency of a non-diesel internal combustion engine that has heretofore never been achieved and can rival the gains of the above-mentioned improvements in the overall performance increase in engine efficiency through volumetric modifications.

In a reciprocating four-stroke engine, such as an automotive engine, when the piston is on its downward stroke just before its compression stroke the cylinder is intaking a fuel/air mixture into the cylinder and it then starts its compression stroke up towards the top of the combustion chamber. As the piston moves upward it compresses this fuel/air mixture. When the piston is at its top-most travel of its stroke or at top dead center (TDC), the piston is at its most optimal position to produce power. With conventional ignition systems, the spark plug will make a small spark when the piston is at or near this TDC position.

The size of the spark generally corresponds to the spark plug gap, which is the distance measured between the cathode electrode and the ground electrode of the sparkplug. Such gaps are typically from 0.02 inch to 0.07 inch. Even at such short distances, a high enough voltage must be provided for the spark to jump the gap between the cathode electrode and the ground electrode. In many ignition systems, the voltage required to generate a spark between the electrodes may range from 4 kV to 50 kV. Such a high voltage is typically provided by means of an ignition or induction coil(s) of the engine that converts low voltage current to a high voltage current that is supplied to the spark plug through a spark plug wire.

The small spark generated by the spark plug in the gap between the spark plug electrodes ignites the fuel/air mixture, which starts to burn. The ignition of the fuel/air mixture does not explode, but rather burns rapidly. The flame front from the burning fuel starts at the discrete location of the spark generated by the spark plug and expands outward to fill the cylinder. The rapidly expanding combustion gases create pressure on the piston dome as the fuel is burned, exerting a downward force on the piston. The problem here is the piston is moving very rapidly downward from TDC as this is happening. As a result, not all the fuel is burned while the piston is at TDC. Power is therefore lost as fuel burns while the piston is moving downward or away from its most power producing position at the top of its stroke. This is the reason automobiles have mufflers, to silence the noise of fuel still trying to burn that did not burn on the power stroke and is still trying to burn while the piston is on its exhaust stroke. All the fuel which does not burn on the power stroke is wasted energy in a normally aspirated combustion engine.

As can be seen, improvements are therefore needed to improve ignition in internal combustion engines so that the fuel is readily burned while the piston is at or near the top of its stroke and thus increase power and efficiency.

BRIEF DESCRIPTION OF THE DRAWINGS

In the following figures, FIGS. 1-4 are shown with the piston at top dead center (TDC) and all valves in the closed position. For a more complete understanding of the embodiments described herein, and the advantages thereof, reference is now made to the following descriptions taken in conjunction with the accompanying figures, in which:

FIG. 1 is a cross-sectional elevational view of a piston and cylinder assembly of an internal combustion engine employing an electrical ignition device configured as an ignition plug and constructed in accordance with an embodiment of the invention;

FIG. 2 is an enlarged view of the circled area of FIG. 1 showing an enlarged image the ignition plug and a cross-sectional view of the combustion chamber of the piston and cylinder assembly of FIG. 1;

FIG. 3 is a cross-sectional elevational view of a hemispherical combustion chamber configuration of a piston and cylinder assembly of an internal combustion engine employing an electrical ignition device configured as an ignition plug that utilizes a pair of laser sources and is constructed in accordance with another embodiment of the invention;

FIG. 4 is a cross-sectional elevational view of still another piston and cylinder assembly of an internal combustion engine employing an electrical ignition device that is incorporated into the cylinder head of the piston and cylinder assembly and constructed in accordance with an embodiment of the invention;

FIG. 7. top plan view of an air induction unit for supplying air for fuel combustion to the air intake of an engine that includes an air ionization chamber with a pair of laser sources for ionizing air used in combustion of fuel in an internal combustion engine;

FIG. 8 is an elevational view of the air induction unit of FIG. 7; and

DETAILED DESCRIPTION

In contrast to existing conventional spark ignition systems where combustion begins at the discrete point of the spark generated by the sparkplug in the gap between the electrodes, the present invention utilizes a unique ignition device that generates a spark that can extend across a large portion of the space within the volume of space of the cylinder above the piston, i.e., the combustion chamber. If the combustion starts across the full width of the combustion chamber instead of at the discrete spark location between the short gap of the spark plug electrodes, more fuel is burned while the piston is at its most power producing position at the top of its compression stroke. This greatly improves power and efficiency and can improve exhaust emissions.

The ignition device of the invention allows the ignition spark to extend a greater distance within the combustion chamber, even the full width of the combustion chamber. This is achieved by ionization of the air or air/fuel mixture in the path of the spark to provide a conductive path for the spark from the cathode electrode (+) to be able to jump a much longer distance (e.g., the width of the combustion chamber) to a remote ground electrode (−). This can be achieved in some cases while utilizing the same or similar voltages to those used in conventional spark ignition systems using conventional spark plugs.

Figure 1:
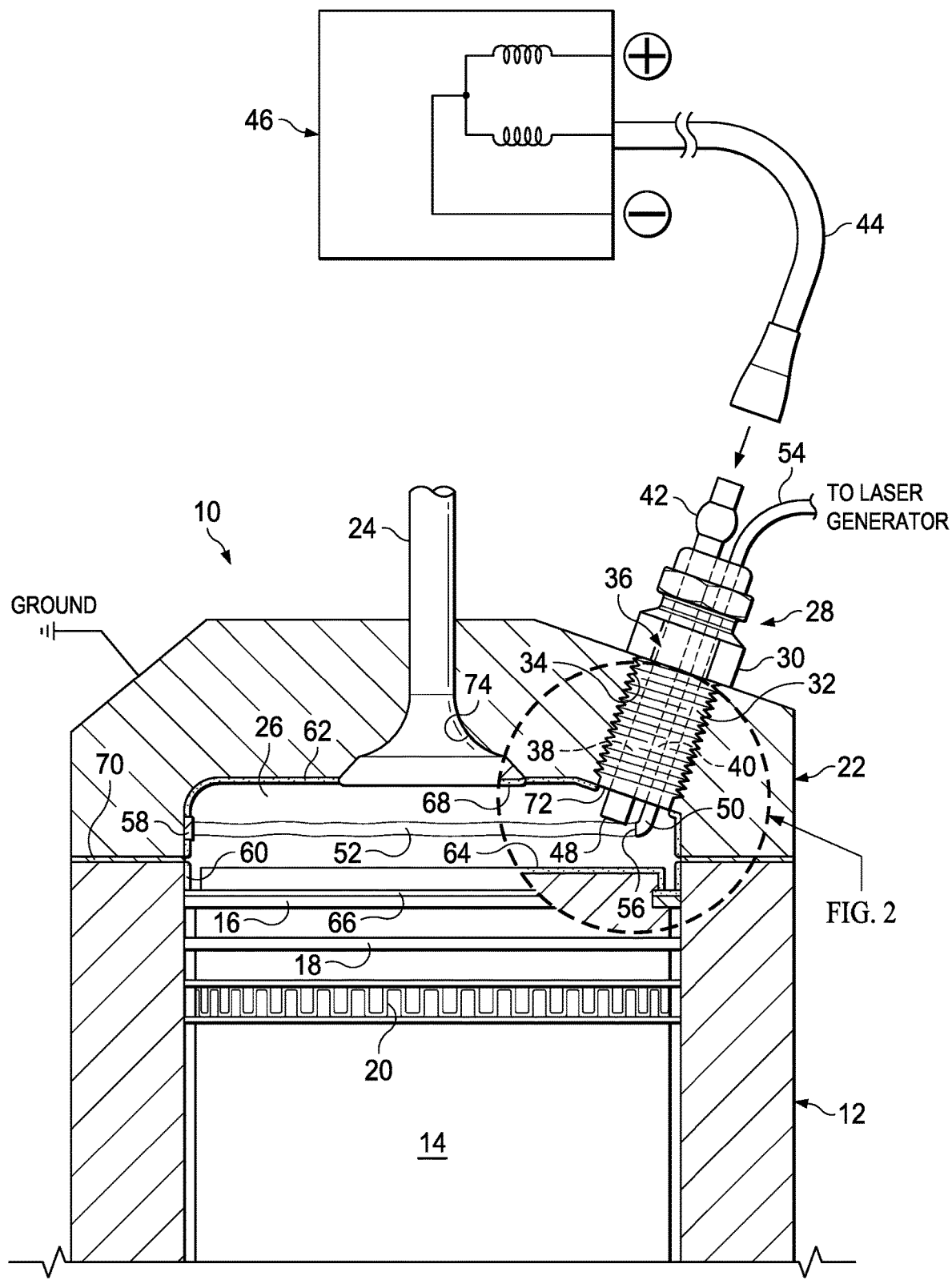

Referring to FIG. 1, a cross-sectional view of a piston and cylinder assembly 10 of an internal combustion engine of the type utilizing a spark ignition to ignite an oxygen/fuel mixture. The oxygen ($O_2$) of the oxygen/fuel mixture is an oxygen-containing gas that is typically air, but it may be other oxygen-containing gases such as an oxygen/nitrogen mixture with higher or lower levels of oxygen than air or a concentrated oxygen gas mixture or even pure oxygen gas. Accordingly, air may be used throughout the following description in reference to the oxygen-containing gas, although it should be understood that other oxygen-containing gases may also be used instead of air provided they are capable of providing the necessary fuel-combustion reaction for the engine.

The fuel is typically gasoline, but may be other fuels as well, liquid or gas, such as natural gas or liquid petroleum gas (LPG), that can be used in internal combustion engines utilizing spark ignitions. The engine of the cylinder and piston assembly 10 may exclude diesel- or biodiesel-fueled engines or other fueled engines that may not utilize an electrical spark ignition. In certain cases, however, where a spark can be used for igniting such fuels, the ignition device may be used in such engines, as well.

The piston and cylinder assembly 10 shown is that used for a four-stroke engine and includes a cylinder 12, which may be formed in an engine block of an engine, and a piston 14 that is received and disposed within the interior of the cylinder 12 for movement therein. One or more piston and cylinder assemblies 10 may be used in an engine. In automotive engines it is common to have 2, 4, 6, 8 or more such piston and cylinder assemblies, which may be arranged in different arrangements, such as straight- or V-shaped arrangement. The present invention, however, should not be limited to any number of piston and cylinder assemblies or particular arrangements. Although, the following discussion is directed toward a piston and cylinder assembly of an internal combustion engine, it should be apparent that the present invention has application to other non-piston-and-cylinder engines, such as a rotary or Wankel engine, etc., or other non-piston-and-cylinder internal combustion engine designs, both known and that may be developed in the future.

Each piston 14 of the assembly 10 will typically be connected to one or more crankshafts (not shown) of the engine through a connecting rod (not shown) connected to piston or wrist pin (not shown) in the body of the piston 14, as with conventional piston and cylinder assemblies. The piston 14 is provided with one or more compression rings 16 that engage and seal the gap between the sidewalls of the cylinder 12 and piston 14. A wiper ring 18 may be located below the compression ring 16 and engages the cylinder wall and facilitates further compression and wipes oil from the cylinder wall. An oil ring 20 may also be provided on the piston 14 below the wiper ring 18 to further wipe oil from the cylinder walls. The rings 16, 18, 20 are each received within corresponding ring grooves formed on the piston for this purpose.

A cylinder head 22 covers the top of the cylinder 12 and may carry two or more valves 24 for introducing air and fuel and/or discharging combustion exhaust gases through intake and exhaust ports formed in the cylinder head 22. It should be noted that although two or more valves may be used, such as the valves 24 in for a four-stroke engine, in some embodiments, such as in a two-stroke engine, there may be no valves or only ports. The present invention has application to ignition systems in such engines as well. A combustion chamber 26 of the assembly 10 is defined by the interior of the cylinder 12, the area above the piston 14 and below the cylinder head 22. In the embodiment shown, the piston 14 is shown at the top of its compression stroke at a TDC position with the valves 24 in a closed position.

An internal combustion ignition device 28 is provided with the piston and cylinder assembly 10. The device 28 is in the form of an ignition plug that includes an ignition device housing or body 30 for carrying and housing the various components of the ignition device 28. As shown, the housing 30 of the device 28 may include a helical threaded portion 32 that is sized and configured for engagement with a port 34 of the cylinder head 22, which is threaded, that communicates with the combustion chamber 26. In other embodiments, the housing 30 may be non-threaded for coupling to a non-threaded port, such as bayonet-type connector or other non-threaded coupling means. The coupling means for coupling the device 28 to the port 34 or cylinder head 22 should be able to withstand the combustion pressures and conditions typically encountered with internal combustion engines.

The ignition device 28 further includes an electrical spark generator 36 that that may be similar in construction to a conventional spark plug but does not include both a cathode electrode and ground electrode that are in close proximity to one another, as with conventional spark plugs. Instead, the spark generator 36 may only include only a cathode electrode 38 carried by the housing 30 that is surrounded by an electrical insulating material 40, such as ceramic, porcelain, etc. If the spark generator 36 does utilize a ground electrode, the gap between such electrodes is greater than that of conventional spark plugs and may be from 0.1 inch, 0.2 inch, 0.3 inch, 0.4 inch, 0.5 inch or more. In the embodiment shown, the spark generator 36 does not include a ground electrode incorporated into the plug housing 30.

The cathode electrode 38 is surrounded by the insulating material 40 and extends through the housing 30 and is electrically coupled at one end to an end terminal 42 located exterior to the cylinder head 22 when the device 28 is coupled to the port 34. The end terminal 42 is configured for electrically coupling to a high-voltage wire or lead 44 of inductor coil assembly 46. The other end 48 of the cathode electrode 36 projects into the combustion chamber 26 a distance when the housing 30 is coupled to the threaded port 34. The electrode 36 constitutes a cathode electrode (+) from which the electrical spark emanates from the end 48 within the combustion chamber 26.

The inductor coil assembly 46 may be similar to those used for conventional spark ignition systems, operating and providing similar voltages and voltage and electrical outputs. In certain instances, the coil assembly 46 and its power source (not shown) may be configured for providing voltages to each cathode electrode 38 that may range from 1 kV to 100 kV or more. In particular embodiments, the voltage provided by the inductor coil assembly to each cathode electrode 38 may be at least, equal to, and/or between any two of 1 kV, 2 kV, 3kV, 4 kV, 5 kV, 6 kV, 7 kV, 8 kV, 9 kV, 10 kV, 15 kV, 20 kV, 25 kV, 30 kV, 35 kV, 40 kV, 45 kV, 50 kV, 55 kV, 60 kV, 65 kV, 70 kV, 75 kV, 80 kV, 85 kV, 90 kV, 95 kV, and 100 kV.

The ignition device 28 further includes a laser source 50 that is coupled to and incorporated into the ignition device housing 30. The laser source 50 provides a high intensity laser output in the form of one or more laser beams 52. The laser beam 52 may be of different dimensions, diameters, sizes and configurations, which can vary with the application. The laser beam 52 is directed at or in near proximity to the end 48 of the cathode electrode 38 so that the spark discharged from the end 48 of cathode 38 is in the path of the laser beam 52.

As shown, the laser source 50 may include a fiber optic cable or laser transmitter 54 that is optically coupled to a laser generator (not shown) that transmits laser light or laser output through the fiber optic cable 54 through the ignition device housing 30 to a lens 56 through which the laser beam 52 is projected into the interior of the combustion chamber 26. The fiber optic cable or laser transmitter 54 and lens 56 may be electrically non-conductive. All or portions of the fiber optic cable 54 and/or lens 56 may be formed from materials, such as glass (e.g., silica glass. etc.), that are capable of withstanding the temperatures, pressures and other conditions present in the combustion chamber 26. The laser generator may be provided within housing 30 of the ignition device 28 itself or be external to and remote from the ignition device housing 30 so the laser is transmitted to and through the fiber optic cable 54 to lens 56. The configuration of the particular engine design may dictate the most appropriate configuration of the laser beam and how it is utilized with the laser source 50.

The laser source 50 and the laser output should be that known in the art that is capable of ionizing a fuel used for the combustion and/or an oxygen-containing gas, such as air. As such, the laser source 50 should be that which produces a laser beam output sufficient for ionization of at least one of the fuel, the oxygen gas, nitrogen gas or other non-oxygen gases that are present in the oxygen-containing gas/fuel mixture utilized for combustion. This may be through a tunnel ionization process. Laser sources that use greatly different wave lengths, energies or character of light or laser output within the same laser beam may be particularly useful to increase ionization. The laser output may be of a continuous wave or pulsed or ultra-fast type and may utilize wavelengths of 200 nm to several μm (e.g., 10 μm) or a combination of such wavelengths. In certain embodiments, these wavelengths may be at least, equal to, and/or between any two of 200 nm, 300 nm, 400 nm, 500 nm, 600 nm, 700 nm, 800 nm, 900 nm, 1 μm, 2 μm, 3 μm, 4 μm, 5 μm, 6 μm, 7 μm, 8 μm, 9 μm, and 10 μm. The utilization of tunnel ionization with more than one wavelength in the same laser beam may also be used. Such different wave lengths, energies or character of laser light or laser output may be those that are suitable or optimal for ionizing each of the various different components of the oxygen-containing gas or fuel, such as those that may be more suitable for ionizing the fuel, oxygen gas, nitrogen gas, etc. In certain applications, the laser source 50 may be that which generates laser beams or outputs utilizing chirped pulse amplification (CPA), which may be a miniaturized CPA. A miniaturized CPA may be provided with the laser generator or incorporated into the housing 30 as part of the ignition device 28. Increases in voltages from those typically used may assist in such instances.

It should be noted that the laser source 50 is not operated to generate a plasma spark or kernel, as in some known laser ignition devices, such as those described in EP2458177A1 and U.S. Pat. No. 7,806,094. Nor is the laser source 50 utilized as a hot-spot laser that heats an absorber or absorber body so that the temperature of the absorber reaches an ignition temperature, such as described in U.S. Pat. No. 8,181,617. Instead, the laser source 50 is only utilized to ionize those gases within the combustion chamber 26 to facilitate conduction of the electrical spark generated by the cathode electrode 38. Any heating by the laser source is merely incidental and would not result in ignition temperatures being reached. The energy required for such ionization of gases for electrical conduction without the formation of a plasma spark or for heating of an absorber above an ignition temperature may be different than that utilized with lasers for such ignition devices, which may be lower or significantly lower.

The laser source 50 or lens 56 is configured, angled or oriented to direct the one or more high intensity laser beams 52 onto or near a ground electrode 58. This may be achieved in a variety of manners. In certain embodiments, when the housing 30 of the ignition device 28 is threaded and fully tightened within the threaded port 34, the lens 56 may be at a preselected orientation so that it will be directed or focused at or near the ground electrode 58. In other applications, the laser source 50 may be movable and/or rotatable within the housing 30 so that the lens 56 may be indexed or otherwise oriented so that it is directed or focused at or near the ground electrode 58. A bayonet-type coupling mechanism of the housing 30 within the port 34 may allow such movement. Sleeves, bushings, bearings, etc., may also be provided with or in the housing 30 to allow such relative movement of the lens 56 or laser source 50 with respect to the housing 30 or portions thereof. The exteriorly exposed portions of the light source 50 and cylinder 12 and/or cylinder head 22 or other components of the piston and cylinder assembly 10 may be provided with markings or indicia to provide an indication of the alignment or non-alignment and indexing of the lens 56 of the light source 50 as it is moved to determine when the lens 56 is properly focused or directed at the ground electrode 58.

The ground electrode 58 is located remote from the cathode electrode 38 a distance, which may be referred to herein as a "gap" distance. As discussed previously, this gap distance differs and well exceeds those gaps between the cathode electrode and the ground electrode utilized for conventional spark plugs. In the embodiment shown in FIG. 1, the ground electrode 58 is located on the wall of the combustion chamber 26 directly opposite from the end 48 of the cathode 38 across generally the entire width or a major portion of the width of the combustion chamber 26. In certain applications, this "gap" distance may range from 0.1 inch, 0.2 inch, 0.3 inch, 0.4 inch 0.5 inch, 0.6 inch, 0.7 inch, 0.8 inch, 0.9 inch, 1 inch, 1.5 inches, 2 inches, 3.5 inches, 4 inches, 4.5 inches, 5 inches or more. In fact, the gap distance between the ground electrode 58 and the end 48 of the cathode electrode 38 from which the generated spark emanates may be limited solely by the width or diameter of the combustion chamber with which the ignition device 28 is used. In certain embodiments, the gap distance may be equal to at least half the width of the combustion chamber or more in certain embodiments. Indeed, the gap distance may be greater than the width of the combustion chamber 26 in certain instance where the cathode electrode and ground electrode are axially offset or located at different axial positions relative to a longitudinal axis of the combustion chamber, such that the cathode and ground electrodes are located diagonally from one another a distance that exceeds the width of the combustion chamber.

The ground electrode 58 is electrically coupled to negative (−) chassis ground. The ground electrode 58 may have a smaller, the same, or a larger exposed surface to those cross-sectional dimensions of the laser beam 52 so that all or a portion of the laser beam 52 is directed onto the surface of the electrode 58.

The ground electrode 58 is formed from an electrically conductive material, such as platinum, aluminum, iron, copper, etc. The electrode 58 may be a provided on or coupled to the wall of the cylinder 12 or cylinder head 22 as a separate body. In other instances, the electrode 58 may be formed from the material of the cylinder 12 or cylinder head 22 itself as an exposed spot or area of the material of the cylinder 12 or cylinder head 22, which may be raised, recessed or flush with the wall of the cylinder 12 or cylinder head 22 and would also be electrically coupled to chassis ground.

Figure 2:
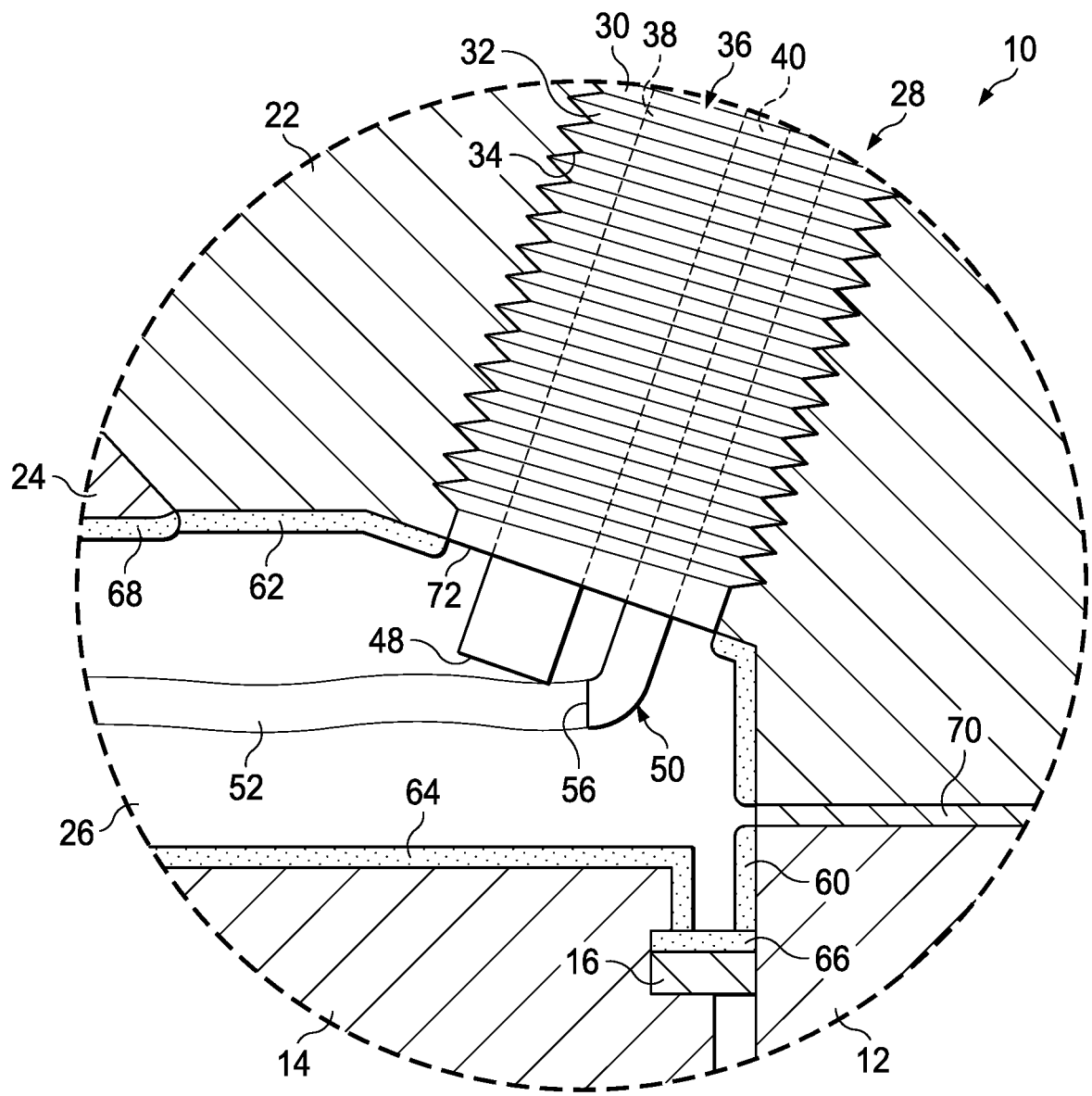

As shown in FIGS. 1 and 2, where the piston and cylinder assembly 10 and/or components thereof are electrically coupled to chassis ground, the interior surfaces that form the combustion chamber 26 may be formed from and/or be electrically insulated with layers of a durable and non-electrically conductive or insulating material. This may be only those exposed surfaces within the combustion chamber 26 when the piston 14 is at or near its TDC position. The insulating material may be a ceramic, porcelain or other non-electrically conductive material that insulates the interior surfaces of the combustion chamber 26 from ground other than the ground electrode 58 that is in electrical communication with chassis ground, as shown in FIG. 1.

The interior surfaces of the cylinder 12 and cylinder head 22 are provided or covered with non-conductive layers 60, 62, respectively. Likewise, referring to FIG. 2, the exposed surfaces of the piston 14, the upper surface of compression ring 16, and valve 24 are also provided or covered with non-conductive layers 64, 66, 68, respectively, such as ceramic, porcelain, etc., so these surfaces are also insulated from electrical ground. The gasket 70 used between the cylinder 12 and cylinder head 22 may be formed from a non-conductive material or that portion exposed to the combustion chamber 26 may be formed from a non-conductive material so that the exposed surface of the gasket 70 is also insulated from ground. The exposed materials of the ignition device 28, such as the exposed portions 72 of the housing 30 and the lens 50, other than the end 48 of the cathode 38, may be formed from electrically non-conductive materials, as well.

In an example of use of the ignition device 28 in a reciprocating four-stroke engine, such as an automotive engine, when the piston 14 of each cylinder of the piston and cylinder assembly 10 employing the device 28 is on its downward stroke just before its compression stroke, the valve 24 opens so that an air/fuel mixture is introduced through valve port 74 of the assembly 10 and into the combustion chamber 26 defined by the cylinder 12 and cylinder head 22. The piston 14 then starts its compression stroke up towards the top of the combustion chamber 26. When the piston is at or near its top-most travel of its stroke or at TDC, as shown in FIG. 1, the piston is at its most optimal position to produce power. As the piston 14 approaches or reaches TDC, a laser output in the form of one or more laser beams 52 is directed from the lens 56 to the ground electrode 58. The gases of the air/fuel mixture in the path 52 of the laser beam is immediately ionized to form an electrically conductive plasma or ionized gas pathway that extends from the end 48 of the cathode electrode 38 to the ground electrode 58. The laser beam 52 may be of a single or mixed wavelength beam and may be formed as a continuous beam or a short intense pulse or pulses that may be formed from chirped pulse amplification (CPA) from the laser source, as previously described.

While the air/fuel mixture is ionized by the laser beam 52, the ignition coil 46 is activated to provide a high voltage current to the cathode 38 of the ignition device 28 so that a spark is generated from the end 48 of the cathode 38. Unlike the spark from a conventional spark plug, the spark that is generated from the ignition device 28 has a much greater length, passing through the highly conductive ionized gas or plasma path formed by the laser beam 52. The generated spark thus extends across the combustion chamber 26 across the lengthy gap towards the remote ground electrode 58 located on the opposite side of the combustion chamber 26. Because the elongated spark extends across the gap or space between the opposite electrodes 48, 58, the spark extends across the entire width or substantially the entire width or a large or major portion of the width of the combustion chamber 26. The combustion therefore starts across the width or a large portion of the width of the combustion chamber 26 and not at a discrete spark location, as produced by the small gap of conventional spark plugs. Because an elongated spark is created, more fuel is burned while the piston 14 is at its most power producing position at the top of its compression stroke. This greatly improves the power and efficiency of the engine without increasing the engine's volumetric characteristics.

Figure 3:
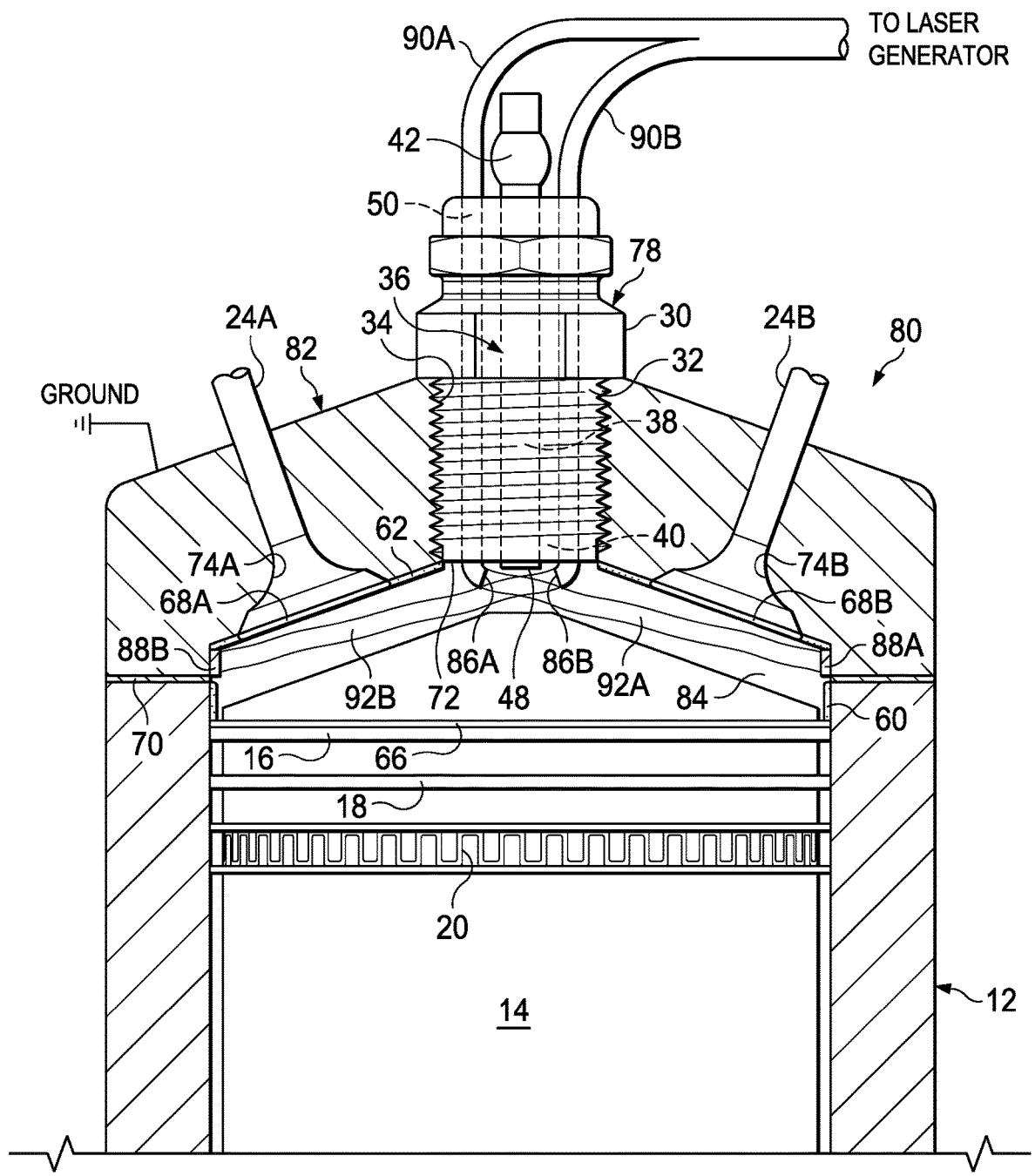

Referring to FIG. 3, an alternate embodiment of an ignition device 78 is shown in use with a hemispherical piston and cylinder assembly 80. The ignition device 78 is similar to that ignition device 28 previously described, with similar components being labeled with the same reference numerals. As shown, a cylinder head 82 defines a combustion chamber 84 that has a domed or hemispherical shape. The ignition device 78 is coupled to the cylinder head 82 so that its end projects into the center of the combustion chamber 84. In the embodiment shown, two valves 24A, 24B are shown, one of which may be an inlet valve for introducing an air/fuel mixture, with the other being an exhaust valve for discharging combustion exhaust gases.

In contrast to the single laser lens of the ignition device 28, the ignition device 78 has two laser lenses 86A, 86B that are each configured and oriented for projecting laser beams to opposite ground spots 88A, 88B, respectively, located on opposite sidewalls of the combustion chamber 84. Fiber optic cables 90A, 90B provide laser output to the lenses 86A, 86B from a laser generator, which may be incorporated with the ignition device housing 30 or be external and remote to the ignition device housing.

The operation of the ignition device 78 is similar to that of the ignition device 28. As the piston 14 reaches the top of its compression stroke, as shown in FIG. 3, laser beams 92A, 92B from the two lenses 86A, 86B directed to the opposite ground electrodes 88A, 88B ionize the air/fuel mixture within the gap between the end 48 of the cathode 38 and the ground electrodes 88A, 88B. In the ignition device 78, the gap between the electrode end 48 and ground spots 88A, 88B is approximately half the width of the cylinder 12. While the air/fuel mixture is ionized, the single cathode electrode 38 located at the top and center of the combustion chamber 84 delivers a spark or sparks. The spark or sparks generated at the cathode 38 extend along each of the opposite ionized gas pathways produced by the two laser beams 92A, 92B. In this case the spark extending along each ionized pathway may be only half the width of the cylinder 12. Because there are two ground electrodes, the resulting sparks of each pathway extend across generally the entire width of the combustion chamber 84 and so that the combustion of fuel of the air/fuel mixture starts across the full width of the combustion chamber 84.

Figure 4:
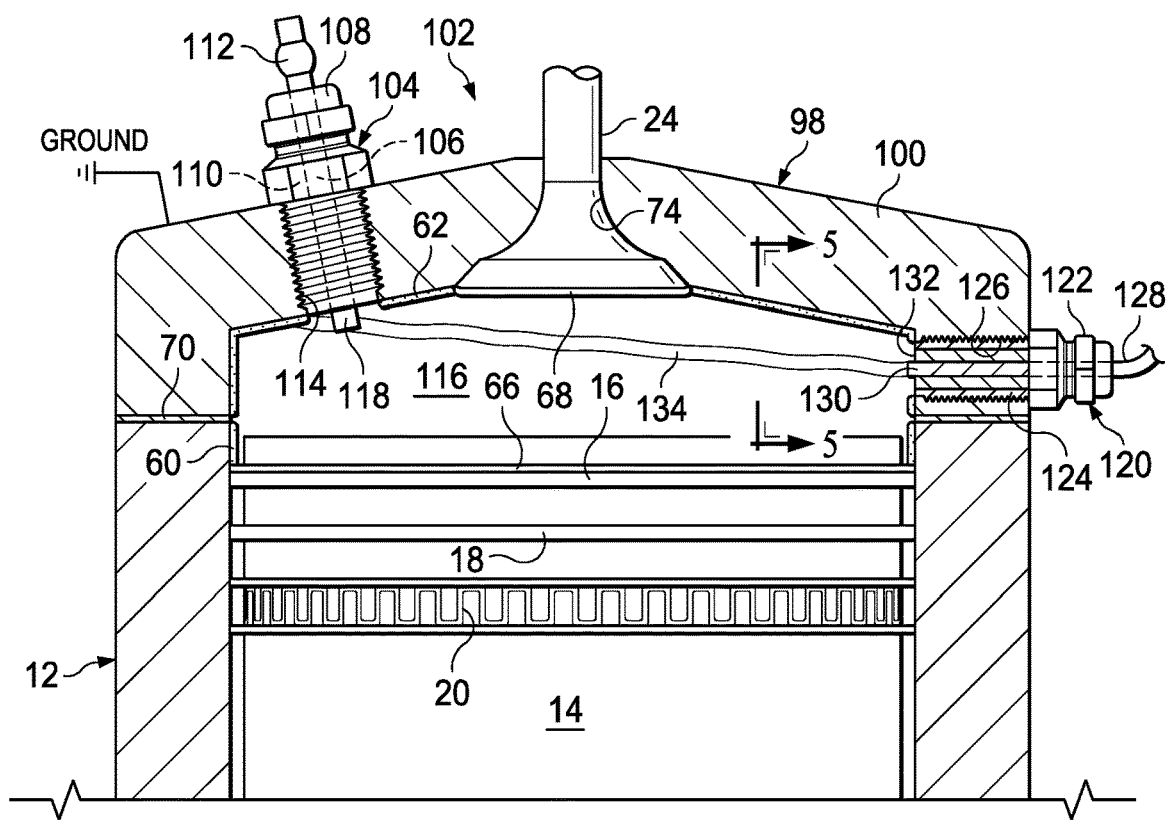

Referring to FIG. 4, another embodiment of an ignition device 98 is shown. The ignition device 98 is similar to those ignition devices 28, 78, previously described, with similar components labeled with the same reference numerals. In the ignition device 98, instead of a separate ignition device housing, such as the ignition device housing 30 of ignition device 28, a cylinder head 100 of a piston and cylinder assembly 102 of an engine forms the ignition device housing.

A separate electrical spark generator 104 is coupled to the cylinder head 100. The spark generator 104 may be similar in construction to a conventional spark plug but does not include a ground electrode. The spark generator 104 may also be configured as a plug that is similar in configuration to the ignition device 28 of FIG. 1 but does not include the laser source 50. The spark generator 104 includes a cathode electrode 106 carried by a spark generator housing or body 108. The cathode electrode 106 is surrounded by the insulating material 110, such as ceramic, porcelain, etc., and extends through the housing 108 and is electrically coupled at one end to an end terminal 112 located exterior to the cylinder head 100 when the housing 108 coupled to a spark generator port 114 formed in the top of the cylinder head 100. The end terminal 112 is configured for electrically coupling to a high-voltage wire or lead of inductor coil assembly, such as the inductor coil assembly 46 of FIG. 1. The other end 118 of the cathode electrode 106 projects into the combustion chamber 116 a distance when the housing 108 is coupled to the threaded port 114. The electrode 106 constitutes a cathode electrode from which an electrical spark emanates from the end 118 within the combustion chamber 116.

As can be seen, the spark generator 104 is located to one side of the combustion chamber 116 on the top of the cylinder head 100. The spark generator 104 may be located at other positions, as well, such as the center or a sidewall of the cylinder head 100. Provided on an opposite sidewall of the cylinder head 100 and coupled thereto is a laser source 120. The laser source 120 is also configured as a plug having a laser plug housing or body 122 with an externally helical threaded portion 124 that is sized and configured for engagement with a laser plug port 126 of the cylinder head 100 that communicates with the combustion chamber 116.

The laser source 120 includes a fiber optic cable 128 that passes through the center of the laser plug housing 122 and is optically coupled to a laser generator (not shown) that transmits laser light or laser output through the fiber optic cable 128 through the laser plug housing 122 to an electrically non-conductive lens 130 through which the laser beam 134 is projected into the interior of the combustion chamber 116 and towards the end 118 of the cathode 106 located on the opposite side of the combustion chamber 116. The laser generator may also be provided within laser plug housing 122 of the laser source 120 itself or be produced remote and external to the laser source housing 122 30, with the laser output being transmitted to the fiber optic cable 128 to lens 130. The configuration of the particular engine design may dictate the most appropriate configuration of the laser beam and how it is utilized with the laser source 120.

Figure 5:
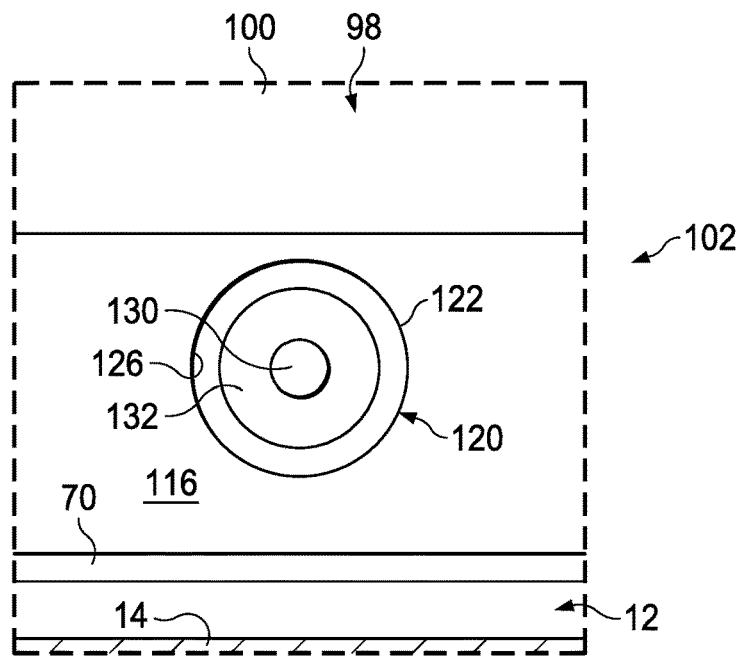
FIG. 5 is an elevational view of a laser source of the electrical ignition device of FIG. 4 incorporated into the sidewall of the cylinder head taken along the lines 5-5 of FIG. 4.

As better seen in FIG. 5, surrounding or immediately adjacent and in close proximity to the lens 130 from which the laser beam is emitted is a ground electrode 132. In the embodiment shown, the ground electrode 132 is configured as a cylinder carried by the plug housing 122 that surrounds the entire lens 130 on all sides. The ground electrode 132 may have other configurations, as well, and may not surround the entire lens or be provided in one or more non-continuous portions. The ground electrode 132 is formed from an electrically conductive material, such as platinum, aluminum, iron, copper, etc. The ground electrode 132 is in electrical communication with chassis ground.

As with piston and cylinder assembly 10, the various components of the piston and cylinder assembly 102 within the combustion chamber 116 may be formed from and/or be electrically insulated with layers of a durable and non-electrically conductive or electrical insulating material.

This may be only those exposed surfaces within the combustion chamber 116 when the piston 14 is at or near its TDC position. The insulating material may be a ceramic, porcelain or other non-electrically conductive material that insulates the interior surfaces of the combustion chamber 116 other than the ground electrode 132.

In operation of the ignition device 98, when the piston 14 of each cylinder of the piston and cylinder assembly 102 is at or near its top-most travel of its stroke or at TDC during the compression stroke, as shown in FIG. 4, one or more laser beams 134 is directed from the lens 130 to the end 118 of the cathode electrode 106. The gases of the air/fuel mixture in the path 134 of the laser beam 134 is ionized to form an electrically conductive plasma or ionized gas pathway that extends from the end 118 of the cathode electrode 106 to the ground electrode 132 surrounding the lens 130. The laser beam may be of a single of mixed wavelength beam and may be formed as a continuous beam or a short intense pulse or pulses that may be formed from chirped pulse amplification (CPA) from the laser source, as previously described.

While the air/fuel mixture is ionized by the laser beam 134, the ignition coil (not shown) is activated to provide a high voltage current to the cathode 106 of the ignition device 98 so that an elongated spark is generated from the end 118 of the cathode 106. Unlike the spark from a conventional spark plug, the spark that is generated from the spark generator 104 passes through the highly conductive ionized gas or plasma path formed by the laser beam 134. The generated spark thus extends across the combustion chamber 116 across the gap towards the remote ground electrode 132 located on the opposite side of the combustion chamber 116. Because the spark extends across the width or a major portion of the width of the combustion chamber 116, as defined by the gap between the electrodes 118, 132, the combustion starts across the width or a large or major portion of the width of the combustion chamber 116 and not at a small, discrete spark location, as produced by conventional spark plugs. More fuel is therefore burned while the piston 14 is at its most power producing position at the top of its compression stroke. Again, this greatly improves the thermal efficiency and power and efficiency of the engine employing the ignition device 98.

Figure 6:
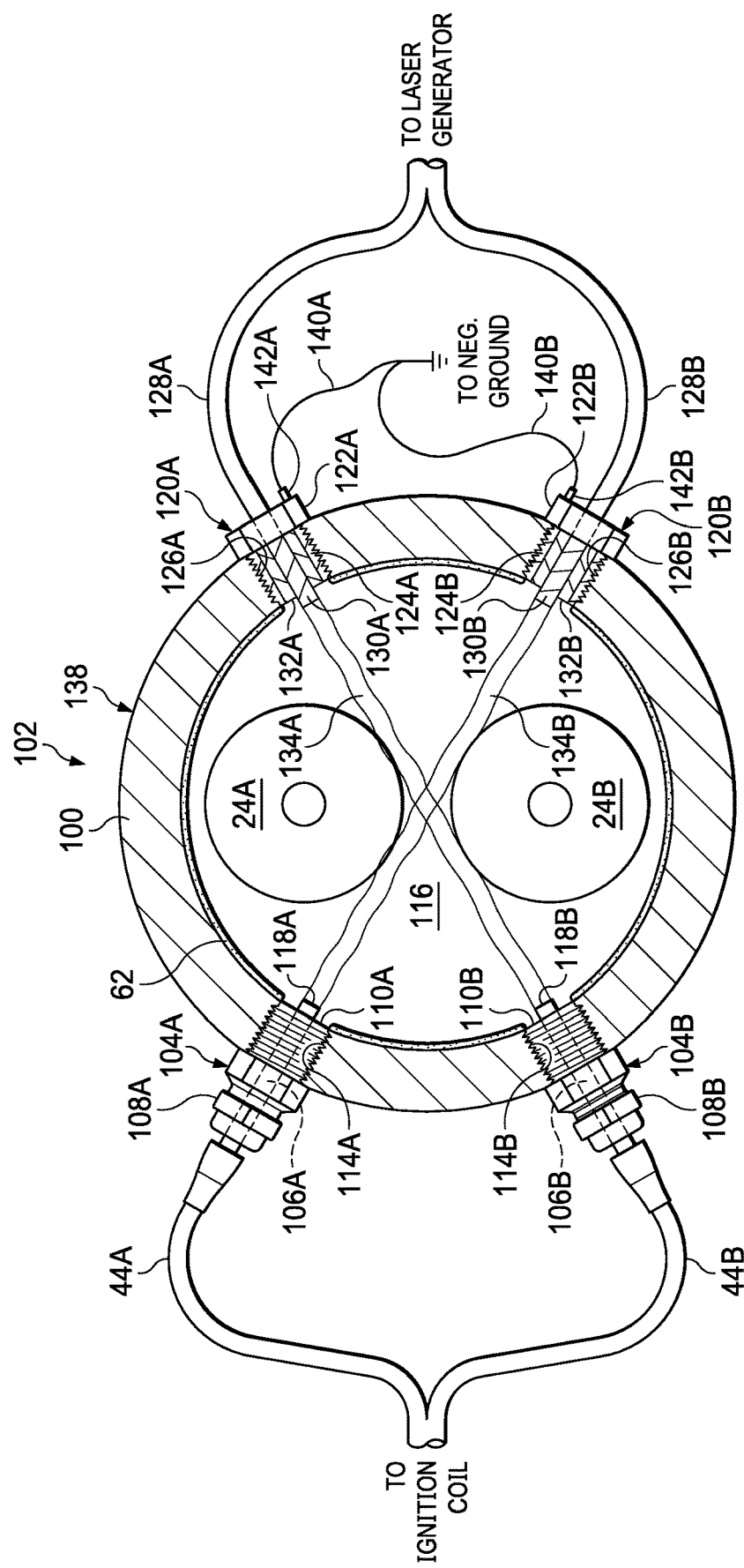
FIG. 6 is cross-sectional plan view of a piston and cylinder assembly of an internal combustion engine employing a pair of electrical ignition devices incorporated into the cylinder head of the piston and cylinder assembly and constructed in accordance with an embodiment of the invention.

Referring to FIG. 6, an alternate version of the piston and cylinder assembly 102 of FIGS. 4-5 is shown utilizing an ignition device 138. The ignition device 138 is similar to that ignition device 98 previously described, with similar components being labeled with the same reference numerals. As shown, the cylinder head 100 forms the ignition device housing for the ignition device 138. The ignition device 138 has a pair of electrical spark generators 104A, 104B, which are each configured similarly to the single spark generator 104 of FIG. 4. Ground electrodes 132A, 132B are provided on the laser sources 120A, 120B. Instead of being coupled to the top of the cylinder head 100, however, the spark generators 104A, 104B are coupled to the sidewalls of the cylinder head 100 and are circumferentially spaced apart (e.g., 10°, 15°, 20°, 25°, 30°, 35°, 45°, 50°, 55°, 60°, 65°, 70°, 75°, 80°, 85°, or 90°) a distance from one another. Similarly, laser sources 120A, 120B of the ignition device 138, which are configured similarly to the laser source 120 of FIG. 4, are coupled to the sidewall of the cylinder head 100. The laser sources 120A, 120B are circumferentially spaced apart on the sidewall of the cylinder head 100 and located directly opposite (i.e., 180°)from the spark generators 104A, 104B, respectively.

The lenses 130A, 130B of each of the laser sources 120A, 120B are positioned and oriented to direct or focus laser beams 134A, 134B to each end 118A, 118B of the cathodes 106A, 106B to ionize the air/fuel mixture in the pathway of the laser beams 134A, 134B for the ignition spark.

In alternate configuration of the various ignition devices described herein, which may be better suited to some engine designs, the entire engine, piston and cylinder assembly, combustion chamber, etc., employing the ignition devices may be isolated from chassis ground. In such cases, as shown with the ignition device 138, a direct wire connection 140A, 142B to terminals 142A, 142B, which are electrically coupled to ground electrodes 132A, 132B, respectively, are utilized to provide negative ground to facilitate electrical spark formation. This would eliminate the need to have some or all of the interior surfaces within the combustion chamber 116 from being covered, coated or otherwise formed with an electrical insulating material, such as the non-conductive ceramic or porcelain layer 62. Such ground isolation can also be used for any of the ignition devices 28, 78, 98, as previously described, so that the surfaces of the combustion chambers with which they are used do not need to be coated with an electrical insulating material.

The operation of the ignition device 138 is similar to that of the ignition device 98. In the case of the ignition device 138, however, each spark generator 104A, 104B delivers sparks that emanate from each of the ends 118A, 118B of the cathodes 106A, 106B and that extend across the width or a large or major portion of the width of the combustion chamber 116 to the ground spots 134A, 134B of the opposite laser sources 120A, 120B. Utilizing the ignition device 138 with a multiple spark generators 104A, 104B and multiple laser beams 134A, 134B provides more efficient ignition and redundancy.

As can be well understood for any of the embodiments described above, multiple (i.e., two or more) ignition devices can be provided with each piston and cylinder assembly, limited only by the physical configuration of the cylinder, cylinder head and/or combustion chamber, and engine compartment.

If necessary, additional ionization of the air/fuel mixture can be achieved by turning an intake track and/or induction unit of the engine into an ionization chamber. This is shown in FIGS. 7 and 8. As shown, an induction unit 150 for supplying air for fuel combustion to the air intake of an internal combustion engine is provided with an air inlet 152 for introducing air into a chamber 154 that forms an air ionization chamber. The ionization chamber 154 is provided with one or more laser sources 156A, 156B provided at different spaced apart locations on the chamber 154. The laser sources 156A, 156B may be similar in construction and configuration to those laser sources 50, 120, previously described, capable of providing laser beams for ionizing the air or oxygen-containing gases introduced into the chamber 154.

The interior of the chamber 154 may be provided with different mirrored or reflective internal surfaces 158 that are angled or oriented to reflect and increase the laser beams or lengths of the laser beam pathways within the chamber 154. The laser sources 156A, 156B may be oriented or angled so that laser beams 160A, 160B emanating from each of the laser sources 156A, 156B is reflected off these mirrored or reflective surfaces 158 so that the interior of the chamber 154 is inundated or completely or substantially filled with the laser beams. In this way, the air that flows from air inlet 152 into the chamber 154 is quickly and readily ionized so that all, substantially all or a portion of the air is ionized. In certain embodiments, the induction unit 150 may be used for ionizing the fuel and or the fuel/air mixture prior to being introduced into the combustion chamber 154.

The ionized air from chamber 154 is discharged through air outlet 162. The air outlet 162 is in fluid communication with the intake valve and combustion chamber of one or more piston and cylinder assemblies where it is combined with fuel and ignited utilizing those ignition devices as have been previously described. The ionization of intake air utilizing the air induction unit 150 may supplement the ionization that occurs within the combustion chambers utilizing the ignition devices that have been described. This may reduce the air resistance to conducting an electrical charge even before it even enters the combustion chamber. The particulars of the design of the top of the piston and cylinder assembly, compression ratio and applications may dictate whether or not such additional ionization utilizing the air induction unit 150 is required.

In certain applications, the ionized air may be provided solely with the air induction unit (i.e., unit 150). In such cases, the laser sources 50 of the ignition device 28 (FIGS. 1, 2), laser source 120 of ignition device 98 coupled to cylinder head 100 (FIGS. 4-6), or laser sources 120A, 12B of ignition device 138 (FIG. 6) may be eliminated. Instead, the air intake unit 150 forms part of the ignition device housing and provides the ionized air of the air/fuel mixture. Where the air induction provides the ionized air, a separate ground electrode is provided within the interior of the combustion chamber, similar to the ground spots 58 of FIG. 1 and/or 88A, 88B of FIG. 3.

Figure 9:
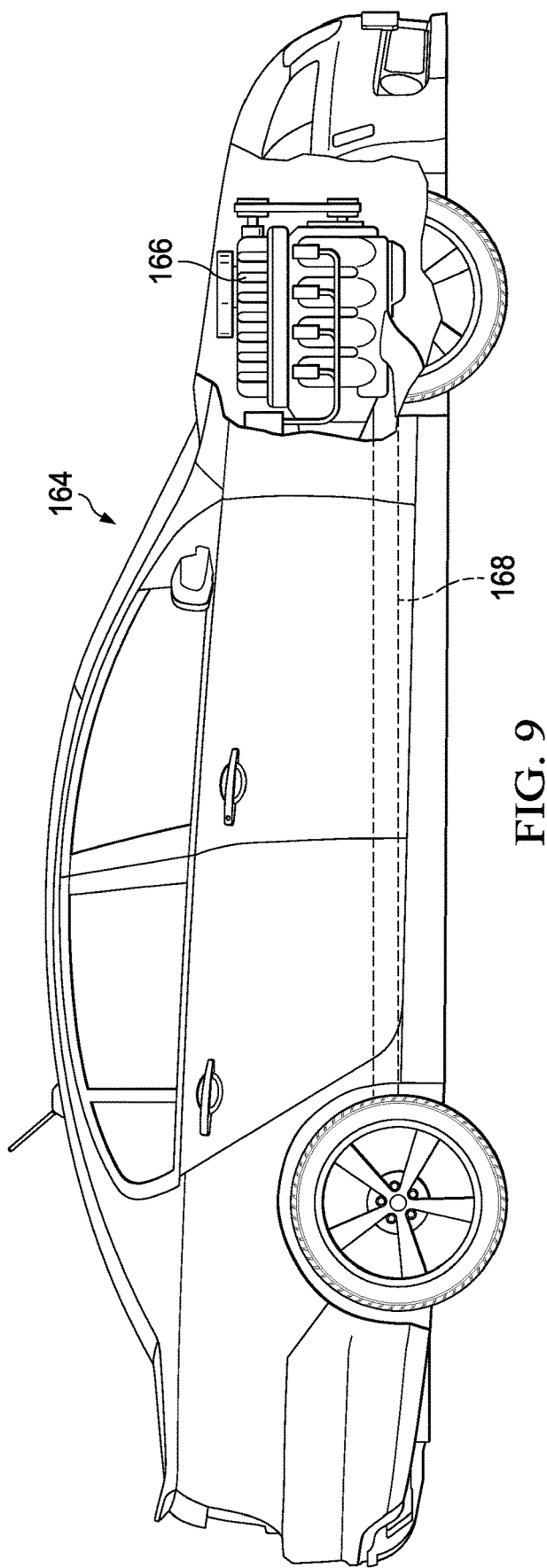
FIG. 9 is an elevational view of an automotive vehicle having an engine employing an electrical ignition device constructed in accordance with particular embodiments of the invention.

Referring to FIG. 9, a motorized vehicle 164 is shown having an internal combustion engine 166. The engine 166 is one employing the ignition devices as described herein. The engine 166, as well as other components of the vehicle 164, are carried or supported by a chassis 168. While the ignition devices described herein are shown represented in use with an internal combustion engine 166 of a motorized vehicle 164, it should be apparent to those skilled in the art that the ignition devices can be used with other devices, stationary or mobile, that may employ an internal combustion engine that requires electrical spark ignition systems. These may include engines employed in water vessels, aircraft and non-vehicle motorized devices and equipment, such as generators, compressors, pumps, etc.

The ignition devices of the invention have significant advantages over conventional spark ignition systems. In contrast to existing conventional spark ignition systems where combustion begins at the discrete point of the spark generated within the small gap of the spark plug, the present invention utilizes generates an elongated spark that can extend across a major or large portion of the space within the combustion chamber above the piston. If the combustion starts across the full width or a major portion of the width of the combustion chamber instead of at the discrete spark location with a conventional spark plug, more fuel is burned while the piston is at its most power-producing position at the top of its compression stroke. This greatly improves thermal efficiency and power and the efficiency of the engine.

Another important advantage of the ignition devices of the present invention is that they can provide a large gain in thermal efficiency given the same volumetric properties of the engine or piston/cylinder assembly. Here, the efficiency of an engine having selected volumetric characteristics can be increased without changing the volumetric characteristics. This is because the thermal efficiency of the engine is increased due to the more efficient combustion of fuel due to the increased spark length provided by the ignition device.

The ignition device can be used as a self-contained plug much like a conventional spark plug. Alternatively, the ignition device can be incorporated into the cylinder, cylinder head or other components of the engine. This may require little or only minimal modification to some existing engines. In many instances, the devices can utilize voltages that are the same or near those used for conventional spark plugs.

While the invention has been shown in some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

I claim:

1. An internal combustion engine ignition device comprising:
an ignition device housing;
a laser source coupled to the ignition device housing configured for generating a laser beam capable of ionizing a fuel and/or an oxygen-containing gas for combustion of the fuel in a combustion chamber prior to spark generation and ignition; and
an electrical spark generator having only a cathode electrode coupled to the ignition device housing, the spark generator being configured for generating an electrical spark that emanates from the cathode within the combustion chamber and extends through the ionized fuel and/or ionized oxygen-containing gas to a remote ground electrode spaced from the electrical spark generator and located on an area of the combustion chamber to provide more efficient and rapid fuel combustion within the combustion chamber.

2. The ignition device of claim 1, wherein:
the ignition device housing comprises a plug that is configured for releasably coupling to a cylinder head of an internal combustion engine.

3. The ignition device of claim 1, wherein:
the ignition device housing comprises at least one of a cylinder head and cylinder of an internal combustion engine.

4. The ignition device of claim 1, wherein:
the laser source generates the laser beam utilizing chirped pulse amplification (CPA).

5. The ignition device of claim 1, further comprising:
an engine cylinder and cylinder head that define the combustion chamber, and wherein the ground electrode is located on an area of at least one of a cylinder head and the cylinder within the combustion chamber.

6. The ignition device of claim 5, wherein:
at least a portion of the surfaces within the combustion chamber surrounding the ground electrode are electrically insulated.

7. The ignition device of claim 5, wherein:
all of the surfaces within the combustion chamber other than the cathode electrode and ground electrode are electrically insulated.

8. The ignition device of claim 1, further comprising:
an induction chamber, the laser source generating the laser beam within the induction chamber to ionize the fuel and/or oxygen-containing gas within the induction chamber, the induction chamber being configured for fluid communication with the combustion chamber for introducing the ionized fuel and/or ionized oxygen-containing gas into the combustion chamber.

9. The ignition device of claim 8, wherein:
the induction chamber is provided with reflective surfaces for reflecting the laser beam.

10. The ignition device of claim 1, wherein:
the gap between the cathode electrode and the remote ground electrode is 0.5 inch or more.

11. The ignition device of claim 1, wherein:
there are at least two laser sources that each generate a laser beam capable of ionizing a fuel and/or an oxygen-containing gas used for combustion in a combustion chamber.

12. The ignition device of claim 1, further comprising:
a vehicle or motorized device having a chassis;
a combustion engine carried or supported by the chassis, the engine having at least one ignition device for ionizing fuel and/or an oxygen-containing gas and combusting fuel within a combustion chamber of the combustion engine; and wherein
the combustion engine is electrically isolated from chassis ground, with the ground electrode being in electrical communication with chassis ground to facilitate generation of the electrical spark by the at least one ignition device.

13. The ignition device of claim 1, wherein:
the cathode electrode is spaced from the ground electrode a distance of at least half the width of the combustion chamber.

14. A method of igniting an oxygen-fuel mixture in an internal combustion engine comprising:
providing at least one ignition device in an internal combustion engine having at least one combustion chamber, the at least one ignition device comprising:
an ignition device housing;
a laser source coupled to the ignition device housing for generating a laser beam capable of ionizing a fuel and/or an oxygen-containing gas used for combustion of the fuel in the combustion chamber;
an electrical spark generator having only a cathode electrode coupled to the ignition device housing, the spark generator being configured for generating an electrical spark that emanates from the cathode electrode; and
a remote ground electrode located on an area of the combustion chamber that is spaced from the electrical spark generator;

introducing fuel and an oxygen-containing gas for combustion into the combustion chamber;

generating laser beam with the laser source so that the fuel and/or oxygen-containing gas used for combustion in the combustion chamber is ionized prior to spark generation and ignition;

generating an electrical spark with the electrical spark generator so that the electrical spark emanates from the cathode electrode and extends through the ionized fuel and/or ionized oxygen-containing gas to the remote ground electrode located within the combustion chamber to provide more efficient and rapid fuel combustion within the combustion chamber.

15. The method of claim 14, wherein:
the laser source generates the laser beam utilizing chirped pulse amplification (CPA).

16. The method of claim 14, wherein:
at least a portion of the surfaces within the combustion chamber surrounding the ground electrode are electrically insulated.

17. The method of claim 14, wherein:
all of the surfaces within the combustion chamber other than the cathode electrode and ground electrode are electrically insulated.

18. The method of claim 14, further comprising:
providing an induction chamber, the laser source generating a laser beam within the induction chamber to ionize the fuel and/or oxygen-containing gas within the induction chamber, the induction chamber being configured for fluid communication with the combustion chamber for introducing the ionized fuel and/or ionized oxygen-containing gas into the combustion chamber.

19. The method of claim 14, wherein:
the internal combustion engine is that of a vehicle or motorized device having a chassis, the combustion engine being carried by the chassis; and wherein the internal combustion engine is electrically isolated from the chassis ground, with the ground electrode being in electrical communication with chassis ground to facilitate generation of the electrical spark by the at least one ignition device.

20. An internal combustion engine ignition device comprising:
an ignition device housing;

a laser source coupled to the ignition device housing for generating a laser beam capable of ionizing a fuel and/or an oxygen-containing gas for combustion of the fuel in a combustion chamber; and an electrical spark generator having a cathode electrode coupled to the ignition device housing, the spark generator being configured for generating an electrical spark that emanates from the cathode within the combustion chamber and extends through the ionized fuel and/or ionized oxygen-containing gas to a ground electrode located within the combustion chamber to provide more efficient and rapid fuel combustion within the combustion chamber; and wherein the laser source generates the laser beam so that the laser beam is in close proximity to that portion of the cathode electrode from which the electrical spark emanates and at least a portion of the laser beam is focused on the ground electrode.

* * * * *